United States Patent
Spadaro et al.

(10) Patent No.: US 7,505,406 B1
(45) Date of Patent: Mar. 17, 2009

(54) PUBLIC TELEPHONE CONTROL WITH VOICE OVER INTERNET PROTOCOL TRANSMISSION

(75) Inventors: Thomas R. Spadaro, Burlington, NJ (US); Martin L. Knodle, Marlton, NJ (US); Fredrick W. Miller, Voohrees, NJ (US); William J. Salibrici, Jobstown, NJ (US); Amr E. Abdelwahab, Deptford, NJ (US)

(73) Assignee: Evercom Systems, Inc., Dallas, TX (US)

( * ) Notice: Subject to any disclaimer, the term of this patent is extended or adjusted under 35 U.S.C. 154(b) by 769 days.

(21) Appl. No.: 09/905,014

(22) Filed: Jul. 13, 2001

(51) Int. Cl.
*H04J 1/16* (2006.01)
*H04J 3/14* (2006.01)

(52) U.S. Cl. ............... 370/230.1; 370/260; 370/395.52; 370/401; 370/466; 379/201.03; 379/207.01; 455/456.3; 455/518

(58) Field of Classification Search ......... 370/260–263, 370/352–353, 354, 355, 356, 395.2, 399, 370/230, 385, 389, 395.52, 401, 466; 379/251.01, 379/207.01, 215.01; 455/456, 517–520
See application file for complete search history.

(56) References Cited

U.S. PATENT DOCUMENTS

| | | | |
|---|---|---|---|
| 3,096,404 A | 7/1963 | Semon |
| 3,113,185 A | 12/1963 | Semon |
| 3,350,515 A | 10/1967 | Semon |
| 3,397,288 A | 8/1968 | Semon |
| 3,398,288 A | 8/1968 | Sanders et al. |
| 3,626,107 A | 12/1971 | Armstrong et al. |
| 3,660,610 A | 5/1972 | Hestad et al. |
| 3,676,605 A | 7/1972 | Johnson |
| 3,798,382 A | 3/1974 | Hoven |
| 3,813,498 A | 5/1974 | Conerly |
| 3,829,617 A | 8/1974 | Caithamer et al. |
| 3,851,121 A | 11/1974 | Marvin |
| 3,864,519 A | 2/1975 | Owen |
| 3,952,160 A | 4/1976 | Pasternack et al. |

(Continued)

FOREIGN PATENT DOCUMENTS

EP    0185365 A1    6/1986

(Continued)

OTHER PUBLICATIONS

Author Unknown, "Shore Tel: Intelligent Phone Systems, Products", Internet Brief, 4 pgs. Retrieved on Nov. 4, 2005, Retrieved from: http://www.shoretel.com/STCorp;/products/architecture/aspx.

(Continued)

*Primary Examiner*—Dwayne D Bost
*Assistant Examiner*—Inder P Mehra
(74) *Attorney, Agent, or Firm*—Fenwick & West LLP

(57) ABSTRACT

Controlled public telephone communication systems includes a plurality of telephones at a given site, a programmable control computer for switching, accessing, routing, timing, billing, and the control of the telephones at the site and a Voice over Internet Protocol (VoIP) network connecting the telephones to an off site public switched telephone network. The programming of the control computer is distributed to remote locations over the VoIP network. A data exchange network interconnects other sites with the telephone communications system being integrated into the data exchange network.

17 Claims, 5 Drawing Sheets

U.S. PATENT DOCUMENTS

| | | |
|---|---|---|
| 3,985,956 A | 10/1976 | Monti et al. |
| 3,997,731 A | 12/1976 | Wilmot et al. |
| 4,001,513 A | 1/1977 | Naylor |
| 4,002,848 A | 1/1977 | Stein |
| 4,027,109 A | 5/1977 | Smith et al. |
| 4,054,756 A | 10/1977 | Comella et al. |
| 4,055,730 A | 10/1977 | Stapleford et al. |
| 4,122,308 A | 10/1978 | Weinberger et al. |
| 4,156,799 A | 5/1979 | Cave |
| 4,188,508 A | 2/1980 | Rogers et al. |
| 4,196,317 A | 4/1980 | Bartelink |
| 4,310,726 A | 1/1982 | Asmuth |
| 4,319,091 A | 3/1982 | Meri |
| 4,326,123 A | 4/1982 | Hosterman |
| 4,333,056 A | 6/1982 | Cave |
| 4,371,752 A | 2/1983 | Matthews et al. |
| 4,387,274 A | 6/1983 | Stein et al. |
| 4,405,833 A | 9/1983 | Cave et al. |
| 4,439,636 A | 3/1984 | Newkirk et al. |
| 4,445,211 A | 4/1984 | Webber |
| 4,477,698 A | 10/1984 | Szlam et al. |
| 4,518,825 A | 5/1985 | Brinkerhoff et al. |
| 4,538,030 A | 8/1985 | Fossett et al. |
| 4,540,855 A | 9/1985 | Szlam et al. |
| 4,552,996 A | 11/1985 | de Bergh |
| 4,559,416 A | 12/1985 | Theis et al. |
| 4,585,904 A | 4/1986 | Mincone et al. |
| 4,593,157 A | 6/1986 | Usdan |
| 4,595,983 A | 6/1986 | Gehalo et al. |
| 4,602,129 A | 7/1986 | Matthews et al. |
| 4,626,630 A | 12/1986 | Waldman |
| 4,629,829 A | 12/1986 | Puhl et al. |
| 4,644,109 A | 2/1987 | Takeda et al. |
| 4,686,699 A | 8/1987 | Wilkie |
| 4,696,028 A | 9/1987 | Morganstein et al. |
| 4,696,031 A | 9/1987 | Freudberg et al. |
| 4,698,840 A | 10/1987 | Dively et al. |
| 4,712,230 A | 12/1987 | Rice et al. |
| 4,723,273 A | 2/1988 | Diesel et al. |
| 4,726,057 A | 2/1988 | Doerry et al. |
| 4,727,577 A | 2/1988 | Frey et al. |
| 4,731,818 A | 3/1988 | Clark, Jr. et al. |
| 4,736,405 A | 4/1988 | Akiyama |
| 4,737,982 A | 4/1988 | Boratgis et al. |
| 4,746,786 A | 5/1988 | Heberle et al. |
| 4,763,350 A | 8/1988 | Immendorfer et al. |
| 4,766,604 A | 8/1988 | Axberg |
| 4,768,223 A | 8/1988 | Kinoshita et al. |
| 4,768,227 A | 8/1988 | Dively et al. |
| 4,769,834 A | 9/1988 | Billinger et al. |
| 4,777,647 A | 10/1988 | Smith et al. |
| 4,782,516 A | 11/1988 | Maybach et al. |
| 4,791,640 A | 12/1988 | Sand |
| 4,794,642 A | 12/1988 | Arbabzadah et al. |
| 4,797,910 A | 1/1989 | Daudelin |
| 4,799,255 A | 1/1989 | Billinger et al. |
| 4,802,207 A | 1/1989 | Uchida |
| 4,803,718 A | 2/1989 | Neil et al. |
| 4,815,120 A | 3/1989 | Kosich |
| 4,825,460 A | 4/1989 | Carter et al. |
| 4,839,917 A | 6/1989 | Oliver |
| 4,850,011 A | 7/1989 | Delmege et al. |
| 4,868,873 A | 9/1989 | Kamil |
| 4,885,765 A | 12/1989 | Shirakawa |
| 4,890,317 A | 12/1989 | Hird et al. |
| 4,896,348 A | 1/1990 | Grantland et al. |
| 4,899,358 A | 2/1990 | Blakley |
| 4,899,375 A | 2/1990 | Bauer et al. |
| 4,901,341 A | 2/1990 | Carter et al. |
| 4,908,852 A | 3/1990 | Hird et al. |
| 4,916,733 A | 4/1990 | Smith et al. |
| 4,920,562 A | 4/1990 | Hird et al. |
| 4,922,519 A | 5/1990 | Daudelin |
| 4,922,520 A | 5/1990 | Bernard et al. |
| 4,924,488 A | 5/1990 | Kosich |
| 4,924,501 A | 5/1990 | Cheeseman et al. |
| 4,932,062 A | 6/1990 | Hamilton |
| 4,933,966 A | 6/1990 | Hird et al. |
| 4,933,967 A | 6/1990 | Lo et al. |
| 4,935,956 A | 6/1990 | Hellwarth et al. |
| 4,937,856 A | 6/1990 | Natarajan |
| 4,937,862 A | 6/1990 | Kosich |
| 4,943,995 A | 7/1990 | Daudelin et al. |
| 4,944,001 A | 7/1990 | Kizuik et al. |
| 4,947,422 A | 8/1990 | Smith et al. |
| 4,947,425 A | 8/1990 | Grizmala et al. |
| 4,979,214 A | 12/1990 | Hamilton |
| 4,991,203 A | 2/1991 | Kakizawa |
| 4,993,062 A | 2/1991 | Dula et al. |
| 4,993,068 A | 2/1991 | Piosenka et al. |
| 5,003,595 A | 3/1991 | Collins et al. |
| 5,008,923 A | 4/1991 | Kitamura et al. |
| 5,020,095 A | 5/1991 | Morganstein et al. |
| 5,022,067 A | 6/1991 | Hughes |
| 5,023,896 A | 6/1991 | Yokouchi et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,093,858 A | 3/1992 | Hird et al. |
| 5,109,405 A | 4/1992 | Morganstein |
| 5,131,024 A | 7/1992 | Pugh et al. |
| 5,134,651 A | 7/1992 | Ortiz et al. |
| 5,150,357 A | 9/1992 | Hopner et al. |
| 5,153,907 A | 10/1992 | Pugh et al. |
| 5,155,761 A | 10/1992 | Hammond |
| 5,163,083 A | 11/1992 | Dowden et al. |
| 5,164,989 A | 11/1992 | Brandman et al. |
| 5,181,237 A | 1/1993 | Dowden et al. |
| 5,187,740 A | 2/1993 | Swaim et al. |
| 5,193,110 A | 3/1993 | Jones et al. |
| 5,200,995 A | 4/1993 | Gaukel et al. |
| 5,210,789 A | 5/1993 | Jeffus et al. |
| 5,216,702 A | 6/1993 | Ramsden |
| 5,218,636 A | 6/1993 | Hamilton |
| 5,220,501 A | 6/1993 | Lawlor et al. |
| 5,222,120 A | 6/1993 | McLeod et al. |
| 5,229,764 A | 7/1993 | Matchett et al. |
| 5,247,569 A | 9/1993 | Cave |
| 5,255,305 A | 10/1993 | Sattar |
| 5,274,698 A | 12/1993 | Jang |
| 5,276,731 A | 1/1994 | Arbel et al. |
| 5,283,825 A | 2/1994 | Druckman et al. |
| 5,283,829 A | 2/1994 | Anderson |
| 5,287,401 A | 2/1994 | Lin |
| 5,305,312 A | 4/1994 | Fornek et al. |
| 5,309,505 A | 5/1994 | Szlam et al. |
| 5,311,589 A | 5/1994 | Bennett et al. |
| 5,319,701 A | 6/1994 | Hird et al. |
| 5,319,702 A | 6/1994 | Kitchin et al. |
| 5,321,754 A | 6/1994 | Fisher et al. |
| 5,323,448 A | 6/1994 | Biggs et al. |
| 5,325,421 A | 6/1994 | Hou et al. |
| 5,325,427 A | 6/1994 | Dighe |
| 5,327,489 A | 7/1994 | Anderson et al. |
| 5,329,578 A | 7/1994 | Brennan et al. |
| 5,333,181 A | 7/1994 | Biggs |
| 5,335,266 A | 8/1994 | Richardson, Jr. et al. |
| 5,345,501 A | 9/1994 | Shelton |
| 5,345,595 A | 9/1994 | Johnson et al. |
| 5,351,285 A | 9/1994 | Katz |
| 5,351,287 A | 9/1994 | Bhattacharyya et al. |
| 5,355,403 A | 10/1994 | Richardson, Jr. et al. |
| 5,369,699 A | 11/1994 | Page et al. |

| | | | | | | |
|---|---|---|---|---|---|---|
| 5,375,161 | A | 12/1994 | Fuller et al. | 6,320,946 | B1 | 11/2001 | Enzmann et al. |
| 5,381,474 | A | 1/1995 | Lahdemaki et al. | 6,320,948 | B1 | 11/2001 | Heilmann et al. |
| 5,394,465 | A | 2/1995 | Jo | 6,324,280 | B2 | 11/2001 | Dunn et al. |
| 5,416,831 | A | 5/1995 | Chewning, III et al. | 6,363,065 | B1 | 3/2002 | Thornton et al. |
| 5,425,087 | A | 6/1995 | Gerber et al. | 6,366,653 | B1 | 4/2002 | Yeh et al. |
| 5,428,662 | A | 6/1995 | Hamilton | 6,381,321 | B1 | 4/2002 | Brown et al. |
| 5,442,696 | A | 8/1995 | Lindberg et al. | 6,404,764 | B1 | 6/2002 | Jones et al. |
| 5,450,485 | A | 9/1995 | Hamilton | 6,404,857 | B1 | 6/2002 | Blair et al. |
| 5,452,347 | A | 9/1995 | Iglehart et al. | 6,404,870 | B1 | 6/2002 | Kia |
| 5,455,819 | A | 10/1995 | Sugiyama | 6,445,682 | B1 * | 9/2002 | Weitz ................. 370/257 |
| 5,461,665 | A | 10/1995 | Shur et al. | 6,480,590 | B1 | 11/2002 | Ku |
| 5,465,293 | A | 11/1995 | Chiller et al. | 6,487,200 | B1 | 11/2002 | Fraser |
| 5,465,387 | A | 11/1995 | Mukherjee | 6,496,477 | B1 * | 12/2002 | Perkins et al. ........ 370/228 |
| 5,471,519 | A | 11/1995 | Howe et al. | 6,529,500 | B1 * | 3/2003 | Pandharipande ...... 370/352 |
| 5,473,686 | A | 12/1995 | Virdee | 6,529,602 | B1 | 3/2003 | Walker et al. |
| 5,483,582 | A | 1/1996 | Pugh et al. | 6,553,336 | B1 | 4/2003 | Johnson et al. |
| 5,483,593 | A | 1/1996 | Gupta et al. | 6,560,323 | B2 | 5/2003 | Gainsboro |
| 5,485,507 | A | 1/1996 | Brown et al. | 6,560,325 | B2 | 5/2003 | Brown et al. |
| 5,497,414 | A | 3/1996 | Bartholomew | 6,611,583 | B1 * | 8/2003 | Gainsboro ............ 379/188 |
| 5,504,810 | A | 4/1996 | McNair | 6,654,722 | B1 | 11/2003 | Aldous et al. |
| 5,524,141 | A | 6/1996 | Braun et al. | 6,665,380 | B1 | 12/2003 | Cree et al. |
| 5,524,145 | A | 6/1996 | Parker | 6,687,360 | B2 * | 2/2004 | Kung et al. ......... 379/211.02 |
| 5,535,261 | A | 7/1996 | Brown et al. | 6,731,630 | B1 * | 5/2004 | Schuster et al. ....... 370/356 |
| 5,539,812 | A | 7/1996 | Kitchin et al. ............. 379/189 | 6,788,775 | B1 | 9/2004 | Simpson |
| 5,544,231 | A | 8/1996 | Cho | 6,795,444 | B1 * | 9/2004 | Vo et al. ............. 370/401 |
| 5,566,229 | A | 10/1996 | Hou et al. | 6,816,469 | B1 * | 11/2004 | Kung et al. ........... 370/260 |
| 5,577,116 | A | 11/1996 | Townsend et al. | 6,876,647 | B2 * | 4/2005 | Celi, Jr. ............. 370/352 |
| 5,583,920 | A | 12/1996 | Wheeler, Jr. | 6,904,139 | B2 | 6/2005 | Brown et al. |
| 5,583,934 | A | 12/1996 | Zhou | 6,920,209 | B1 | 7/2005 | Gainsboro |
| 5,606,604 | A | 2/1997 | Rosenblatt et al. | 6,985,478 | B2 | 1/2006 | Pogossiants et al. |
| 5,617,471 | A | 4/1997 | Rogers et al. | 7,039,171 | B2 | 5/2006 | Gickler |
| 5,619,561 | A | 4/1997 | Reese | 7,042,992 | B1 | 5/2006 | Falcone et al. |
| 5,627,887 | A | 5/1997 | Freedman | 7,046,782 | B2 | 5/2006 | Miller |
| 5,634,126 | A | 5/1997 | Norell | 7,085,359 | B2 | 8/2006 | Crites et al. |
| 5,651,056 | A | 7/1997 | Eting et al. | 7,302,053 | B2 | 11/2007 | Chang et al. |
| 5,655,013 | A | 8/1997 | Gainsboro | 7,333,798 | B2 | 2/2008 | Hodge |
| 5,722,418 | A | 3/1998 | Bro | 7,360,087 | B2 | 4/2008 | Jorgensen et al. |
| 5,724,404 | A | 3/1998 | Garcia et al. | 7,360,090 | B1 | 4/2008 | Doskow et al. |
| 5,742,905 | A | 4/1998 | Pepe et al. | 2001/0028649 | A1 * | 10/2001 | Pogossiants et al. |
| 5,745,553 | A | 4/1998 | Mirville et al. | 2001/0036821 | A1 | 11/2001 | Gainsboro et al. |
| 5,745,558 | A | 4/1998 | Richardson, Jr. et al. | 2001/0041590 | A1 | 11/2001 | Silberfenig et al. |
| 5,757,781 | A | 5/1998 | Gilman et al. | 2002/0071537 | A1 * | 6/2002 | Gainsboro ............ 379/188 |
| 5,768,355 | A | 6/1998 | Salibrici et al. ............. 379/189 | 2002/0141386 | A1 * | 10/2002 | Minert et al. |
| 5,777,558 | A | 7/1998 | Pennypacker et al. | 2002/0176403 | A1 | 11/2002 | Radian |
| 5,796,811 | A | 8/1998 | McFarlen | 2003/0002639 | A1 | 1/2003 | Huie |
| 5,799,068 | A | 8/1998 | Kikinis et al. | 2003/0023714 | A1 * | 1/2003 | Zeigler et al. |
| 5,805,685 | A | 9/1998 | McFarlen | 2003/0133558 | A1 * | 7/2003 | Kung et al. |
| 5,809,125 | A | 9/1998 | Gammino | 2003/0185204 | A1 | 10/2003 | Murdock |
| 5,844,978 | A | 12/1998 | Reuss et al. | 2004/0052218 | A1 | 3/2004 | Knappe |
| 5,859,907 | A | 1/1999 | Kawahara et al. | 2006/0209797 | A1 | 9/2006 | Anisimov et al. |
| 5,862,519 | A | 1/1999 | Sharma et al. | 2006/0285650 | A1 | 12/2006 | Hodge |
| 5,867,559 | A | 2/1999 | Jorgensen et al. | 2006/0286962 | A1 | 12/2006 | Davis |
| 5,875,230 | A | 2/1999 | Ganley et al. | 2007/0071206 | A1 | 3/2007 | Gainsboro et al. |
| 5,883,945 | A | 3/1999 | Richardson, Jr. et al. | 2007/0115924 | A1 | 5/2007 | Schneider et al. |
| 5,907,602 | A * | 5/1999 | Peel et al. ............ 379/114.14 | 2007/0242658 | A1 | 10/2007 | Rae et al. |
| 5,923,746 | A | 7/1999 | Baker et al. | 2007/0263812 | A1 | 11/2007 | Polozola et al. |
| 5,926,533 | A | 7/1999 | Gainsboro | 2008/0040780 | A1 | 2/2008 | Reinhold |
| 5,937,042 | A | 8/1999 | Sofman | | | | |
| 5,943,403 | A | 8/1999 | Richardson, Jr. et al. | | | | |
| 5,946,386 | A | 8/1999 | Rogers et al. | | | | |
| 5,960,064 | A | 9/1999 | Foladare et al. | | | | |
| 6,031,895 | A | 2/2000 | Cohn et al. | | | | |
| 6,052,454 | A | 4/2000 | Kek et al. | | | | |
| 6,064,963 | A | 5/2000 | Gainsboro | | | | |
| 6,072,860 | A | 6/2000 | Kek et al. | | | | |
| 6,075,843 | A | 6/2000 | Cave | | | | |
| 6,097,804 | A | 8/2000 | Gilbert et al. ............... 39/320 | | | | |
| 6,134,320 | A | 10/2000 | Swan et al. | | | | |
| 6,141,406 | A | 10/2000 | Johnson | | | | |
| 6,169,789 | B1 | 1/2001 | Rao et al. | | | | |
| RE37,073 | E | 2/2001 | Hammond | | | | |
| 6,188,751 | B1 | 2/2001 | Scherer | | | | |
| 6,249,570 | B1 | 6/2001 | Glowny et al. | | | | |

FOREIGN PATENT DOCUMENTS

| | | |
|---|---|---|
| EP | 0814583 A2 | 12/1997 |
| EP | 1 175 074 | 1/2002 |
| FR | 2600850 | 12/1987 |
| GB | 2134749 A | 8/1984 |
| JP | 5-30193 | 2/1993 |
| JP | 63-03305 | 10/1994 |
| JP | 63-033054 | 12/1994 |
| JP | 2003110758 | 4/2003 |
| WO | WO 96/20448 A1 | 7/1996 |
| WO | WO 97/22208 | 6/1997 |
| WO | WO 98/13993 A1 | 4/1998 |

WO   WO 00/54491 A1   9/2000

OTHER PUBLICATIONS

Bobb Swope, et al., U.S. Appl. No. 09/640,831, Entitled "System and Method for Reverse Billing for Telephone Call," filed Aug. 17, 2000. (Reference not included).
Michael Lord, U.S. Appl. No. 09/955,253, Entitled "Method and Apparatus for Exchanging Data Between a Primary Computer System to Ensure Transactional Reconciliation Between the Systems," filed Nov. 27, 2001. (Reference not included).
Nadia Draizin, et al., U.S. Appl. No. 10/022,946, Entitled "A Method for Determining an Entity Resonsible for Billing a Called Party," filed Dec. 17, 2001. (Reference not included).
John J. Viola, et al., U.S. Appl. No. 10/135,878, Entitled "Information Management and Movement System and Method," filed Apr. 29, 2002. (Reference not included).
Richard Falcone, et al., U.S. Appl. No. 10/190,135, Entitled "Systems and Methods for Offering a Service to a Party Associated with a Blocked Call," filed Jul. 3, 2002. (Reference not included).
Michael Lord, U.S. Appl. No. 10/252,956, Entitled "Three-Way Telephone Call Prevention System and Method," filed Sep. 20, 2002. (Reference not included).
Dick Falcone, et al., U.S. Appl. No. 10/135,883, Entitled "Optimizing Profitability in Business Transactions," filed Nov. 25, 2003. (Reference not included).
Marc Hite, et al., U.S. Appl. No. 10/437,839, Entitled "Intelligent Queuing of Transaction Records," filed May 14, 2003. (Reference not included).
Richard Falcone, et al., U.S. Appl. No. 10/360,248, Entitled "Systems and Methods for Account Establishment and Transaction Management Using Interrupt Messaging," filed Feb. 7, 2003. (Reference not included).
Richard Falcone, et al., U.S. Appl. No. 10/360,442, Entitled "Systems and Methods for Transaction Authorization Determination," filed Feb. 7, 2003. (Reference not included).
"SciDyn VoIP Technology Now Available for Call Control Solutions," SciDynTM Press Release, [online] [Retrieved on Nov. 4, 2005], Retrieved from: http://www.scidyn.com/news/pr/0122pr.html.
"Call Control—Commander II:," SciDynTM Products, [online] [Retrieved on Nov. 4, 2005], Retrieved from: http://www.scidyn.com/products/commander2.html.
"Smart Features for Optimizing Your Network," SciDynTM BubbleLINK(R), [online] [Retrieved on Nov. 4, 2005], Retrieved from: http://www.scidyn.com/products/bubble.html.
"BubbleLINK(R) Software Architecture," SciDynTM, The Voice of IP Technology TM, [online] [Retrieved on Nov. 4, 2005], Retrieved from: http://www.scidyn.com/products/BubbleLink%20White.pdf.
Anderson, Susan, "Three-Way Call Detect . . . Close Enough to Perfect?" Correctional Communications Quarterly, pp. 16-20, Oct. 1993.
Bahl, L. "A Maximum Likelihood Approach to Continuous Speech Recovery," Readings in speech Recognition, Ed. A. Waibel and K. Lee, Morgan Kaufmann Publishers, pp. 308-319, IEEE 1983.

Batten, A. "Personal Communications Service and the Intelligent Network," British Telecommunications Engineering, vol. 9, pp. 88-91, Aug. 1990.
DPD/120-JP Product on Display at Communications Tokyo '01, Apr. 2-5, 1991 (Product described in U.S. Appl. No. 5,218,636).
European Examination Report, EP07251570.3, May 29, 2008, 5 pages.
LazerVoice, Digital Recording System Inmate Services, 1997-1998, Schlumberger Technologied, Inc./LazerVoice STIL V0222 LazerVoice User'Manual - Version 2.22, pp. 1-41, published Apr. 28, 1998 by Schlumberger Technologies, Inc/LazerVoice of Mobile, Alabama.
LazerPhone, Powerful Performance Uncompromising Standards, 1998.
Lee, K., "Large-Vocabulary Speaker-Independent Continuous Speech Recognition Using HMM," Carnegie Mellon University Department of Electrical and Computer Engineering, CMU-CS-88-148, Apr. 1988.
OSSGR, vol. 3, "Feature Specific Documents," Technical Ref. TSY-000271 FSD 85-01-0100 Calling Card Service - Published by Bell Communications Research-Revision #3, Dated Mar. 1988.
OSSGR, vol. 3, "Feature Specific Documents," Technical Ref. TSY-000271 FSD-85-01-0200 Collect Billing - Published by Bell Communications Research-Revision #3 Dated Mar. 1988.
PCT International Search Report, PCT/US99/09493, Aug. 20, 1999, 5 pages.
PCT Written Opinion, PCT/US99/09493, Feb. 9, 2000, 12 pages.
"PPCS (Prison Prepaid Card System)", DiaVox Technologies, Inc., Nov. 2000, 10 pages.
Scidyn Commander 3-Way Call Detection System [online] [Retrieved on Jun. 20, 2006] Retrieved from: http://www.scidyn.com/products/Commander%203-way%20Detection.pdf, 5 pages.
"Systems 20" Value Added Communications (VAC), Nov. 1992, Brochure (4 pages).
Telematic "ConQuest III Inmate Telephone System," Nov. 1992.
Thermos, P., "Two Attacks Against VoIP," Security Focus, XP-002444627, Apr. 4, 2006, pp. 1-8.
U.S. Appl. No. 09/229,385, Cree et al., filed Jan. 1999.
U.S. Appl. No. 09/905,014, Spadaro et al., Entitled "Public Telephone Control with Voice Over Internet Protocol Transmission," filed Jul. 13, 2001.
U.S. Appl. No. 10/642,532, Rae et al., Entitled "Centralized Cell Processing," filed Aug. 15, 2003.
US. Appl. No. 10/646,638, filed Aug. 22, 2003.
U.S. Appl. No. 10/800,473, Rae et al., Entitled "Call Processing with Voice Over Internet Protocol Transmission," filed Mar. 15, 2004.
U.S. Appl. No. 11/777,168, Rae et al., Entitled "Inmate Management and Cell Processing Systems and Methods," filed Jul. 12, 2007.
"VoIP the Evolving Solution and the Evoling Threat," Internet Security Systems, Inc., XP-002444626, 2004, pp. 1-7.

* cited by examiner

PUBLIC TELEPHONE CONTROL WITH VOICE OVER INTERNET PROTOCOL TRANSMISSION

FIELD OF THE INVENTION

This invention relates to the control of public telephones at a given site and the processing of voice telephone calls with the calls being routed over Voice over Internet Protocol networks.

BACKGROUND OF THE INVENTION

With typical coin operated public telephones a caller manually dials appropriate information over transmission means, such as local wire loops connected to a computing and switching means called a "central office switch," which first collects the dialed caller information, processes the call, and controls the switching, accessing, and routing of caller information over long-distance transmission means to other similarly-arranged computing and switching means that are remotely located. In the past voice telephone calls were connected to a human operator to provide assistance in accounting and billing for a call. Access over additional long-distance transmission means was provided to a last computing and switching means connected to the local loop of a destination telephone terminal instrument and various computing and switching means which record the call numbers and timing and further arrange the accounting and billing for the public telephones and calls.

U.S. Pat. No. 4,935,956, Hellwarth, et al. describes a public phone service that permits and arranges long distance calls, the charges of which can be billed to either a credit account, the called party, or to a third party with a computer recording and accounting for the revenues collected from the telephone service. This is an example of a controlled public telephone system.

Telephone instruments which are accessible to the public for placing telephone calls are used in locations which are accessible to persons who are not necessarily responsible for their use. Often, public telephones are located in areas where restrictions must be placed on their use. For example, in prisons limitations are placed on the destination telephones which may be called. In order to control the destination numbers it is necessary to detect attempted three-way calls. U.S. Pat. No. 5,768,355, Salibrici et al., shows a three-way call detection system which uses digital signal processing to identify a third party connection. The three-way call detection of this patent is used in the Commander™ telephone system supplied by Science Dynamics Corporation. This is another example of a controlled public telephone system.

Recently, voice over internet protocol (VoIP) has been used for transmitting packets of data representing voice telephone messages. A VoIP gateway permits VoIP sessions to be conducted with called parties such as a called party having a PC connected to a Public Switching Transmission Network (PSTN) by a telephone line.

It is an object of the present invention to use Voice over Internet Protocol networks to transmit information from a controlled public telephone system.

SUMMARY OF THE INVENTION

In accordance with the present invention a controlled public telephone communication system has a plurality of telephones at a given site and a programmable computer for switching, accessing, routing, timing, billing, and the control of the telephones. The telephones are selectively connected to an off site switched telephone network over a Voice over Internet Protocol network.

Further in accordance with the invention the programming for the computer is not all performed by the computer at the site. The system of the present invention distributes the processing to remote locations over an Intranet or Internet network. In accordance with the invention the distribution of the data processing to remote locations is integrated with the distribution of telephony signals over the Voice over Internet Protocol network.

Further in accordance with the invention, the processing of three way call detection is moved beyond the VoIP network so that signal loss or degradation by VoIP does not interfere with three way call detection.

The foregoing and other objects, features and advantages of the invention will be better understood from the following more detailed description and dependent claims.

SHORT DESCRIPTION OF THE DRAWINGS

DESCRIPTION OF THE PREFERRED EMBODIMENT

Figure 1:
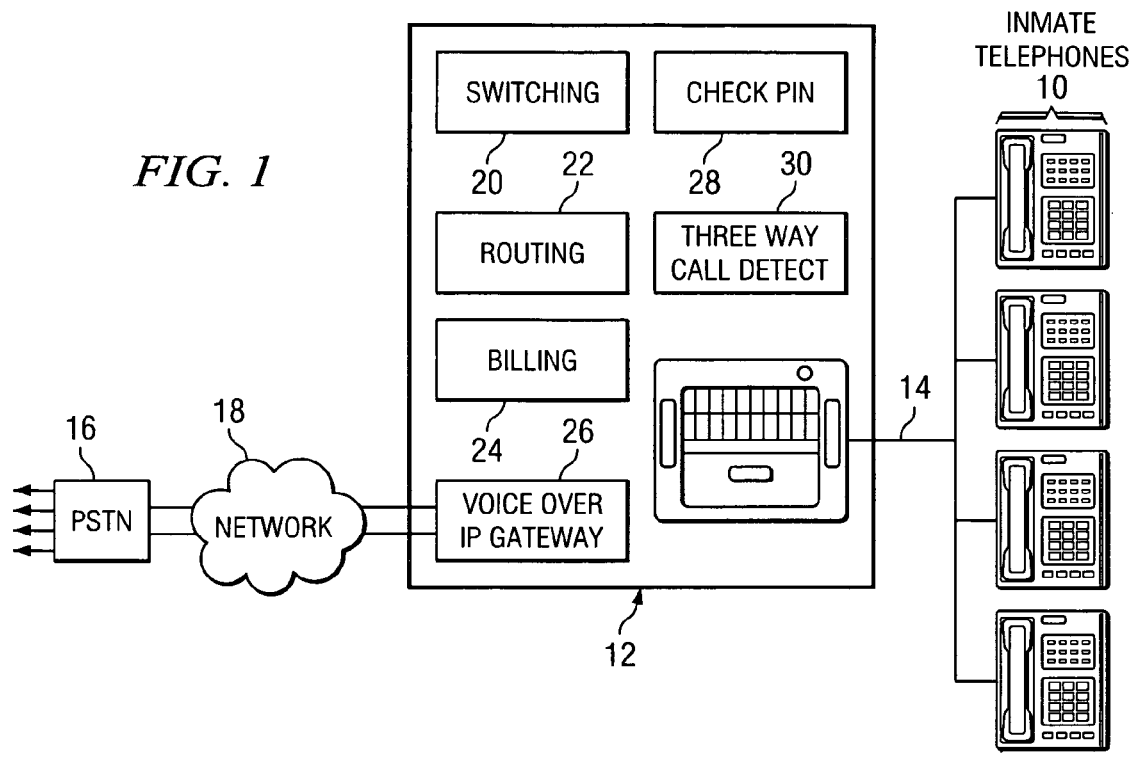
FIG. 1 shows a block diagram of a controlled public telephone system of the present invention.

FIG. 1 shows a controlled public telephone communication system including a plurality of public telephones 10 at a given site. The site may, for example, be a prison in which the use of the public telephones is monitored and controlled. Other sites for application of such control include hotels, airports, convention centers, or any location both public and private which contains a plurality of public telephones. A programable computer 12 at the site is provided for switching, accessing, routing, timing, billing and the control of the telephones 10 at the site. Telephones 10 are connected to computer 12 by wire lines 14. The computer 12 may be of the type shown in U.S. Pat. No. 4,935,956, Hellworth or of the commercially available type provided by Science Dynamics Corporation under their Commander™ designation.

Computer 12 has a modem which establishes a connection to a desired Public Switched Telephone Network ("PSTN") 16. The PSTN is any of those provided by AT&T, GTE, a Regional Bell Operating Company and others comprising multiple switching offices. As is known in the art, a Public Switched Telephone Network ("PSTN") includes a hierarchy of telephony switching offices. Individual subscribers are accessed on "local loops" or individual telephone lines to a nearby telephone exchange called an "end office" also called an "end telephony office". One or more end offices may be accessed to a "local central office," also called a "local central telephony office" or accessed to a "toll office." An end office may also function as a local central office (e.g., in a remote area or rural area). Alternatively, the system can terminate in a Private Branch Exchange instead of the PSTN.

In accordance with the present invention the telephones 10 are selectively connected to the off site switch telephone network 16 over an Internet Protocol (IP) network 18 via Voice over Internet Protocol (VoIP) gateway 26. The Internet Protocol (IP) network may be a Wide Area Network (WAN) or a local area network (LAN). Computer 12 selectively connects the telephones with the Voice over Internet Protocol gateway 26. The Internet Protocol ("IP") is a routing protocol designed to route traffic within a network or between networks. Voice-over-IP is a method for providing voice capabilities over an IP network such as the Internet or an intranet. In such networks data packets are sent to and from communication sites to facilitate communication. In communication systems utilizing a Voice over Internet Protocol (IP) protocol, these packets are commonly referred to as datagrams. In typical Voice over IP networks, each communication site sends datagrams to other communication sites. There are different approaches to sending datagrams.

The control computer 12 supports a variety of applications, such as remote configuration, management and back-up, bandwidth allocation and control, least cost routing, Voice over Internet Protocol (or Voice over IP), as well various telephony related applications. In certain preferred embodiments, control signals per ITU recommendation H.323, and audio based media streams using RTP per Internet RFC1889 are applied. Alternatively control signals could be applied using other protocols such as SIP per Internet RFC 2543.

FIG. 1 shows that the computer 12 performs the function of switching, indicated at 20, routing, indicated at 22, and billing, indicated at 24. Typically a prison environment such as described in the example has rules and regulations regarding what each inmate is allowed for telephone usage. The telephone user first dials a calling card number and a PIN code which is checked at 28. A calling card number is associated with the PIN code. Control computers such as the Commander™ have stored therein the restrictions on telephone usage associated with that PIN number. As an example, on Monday the inmate may be allowed to call his attorney or to call his mother. As part of the restriction on telephone usage the Commander™ provides a three-way call detect system 30 as described in the aforementioned Salibrici et al. patent. This is one of the restriction imposed by control computer 12.

Voice data is processed by means of a vocoder (Voice Coder/Decoder). This process utilizes one of several standard schemes such as ITU recommendation G.723.1, G.729, or G.711 among others. VoIP Gateway 26 is provided to service and control Voice over IP ("VoIP") communications. Various types of VoIP communications may be effectively managed and controlled in accordance with preferred embodiments of the present invention.

Figure 2:
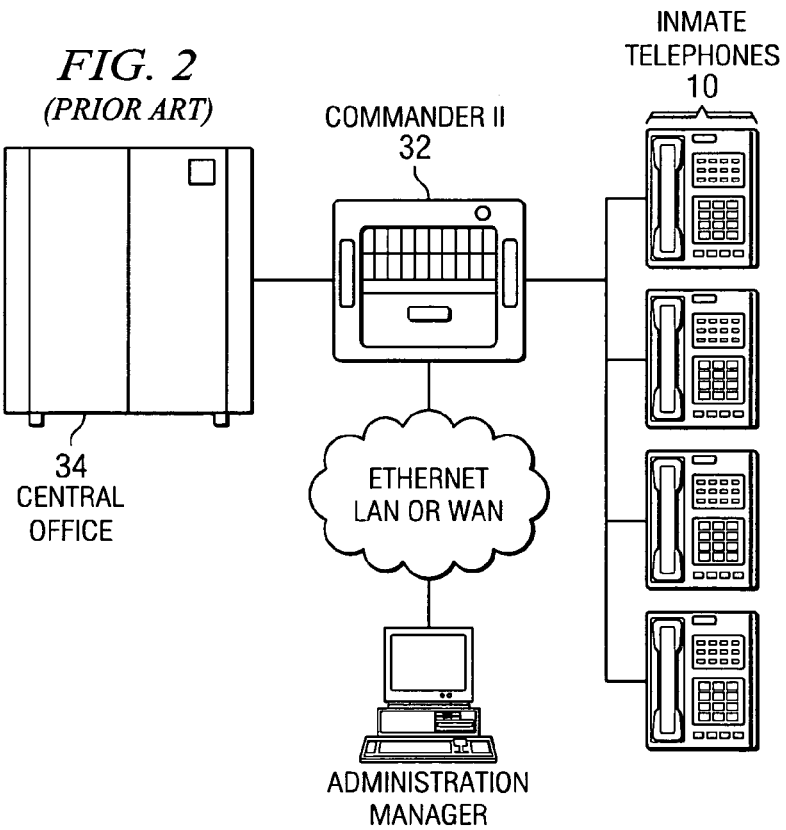
FIG. 2 shows prior art public telephones at a single site.
Figure 3:
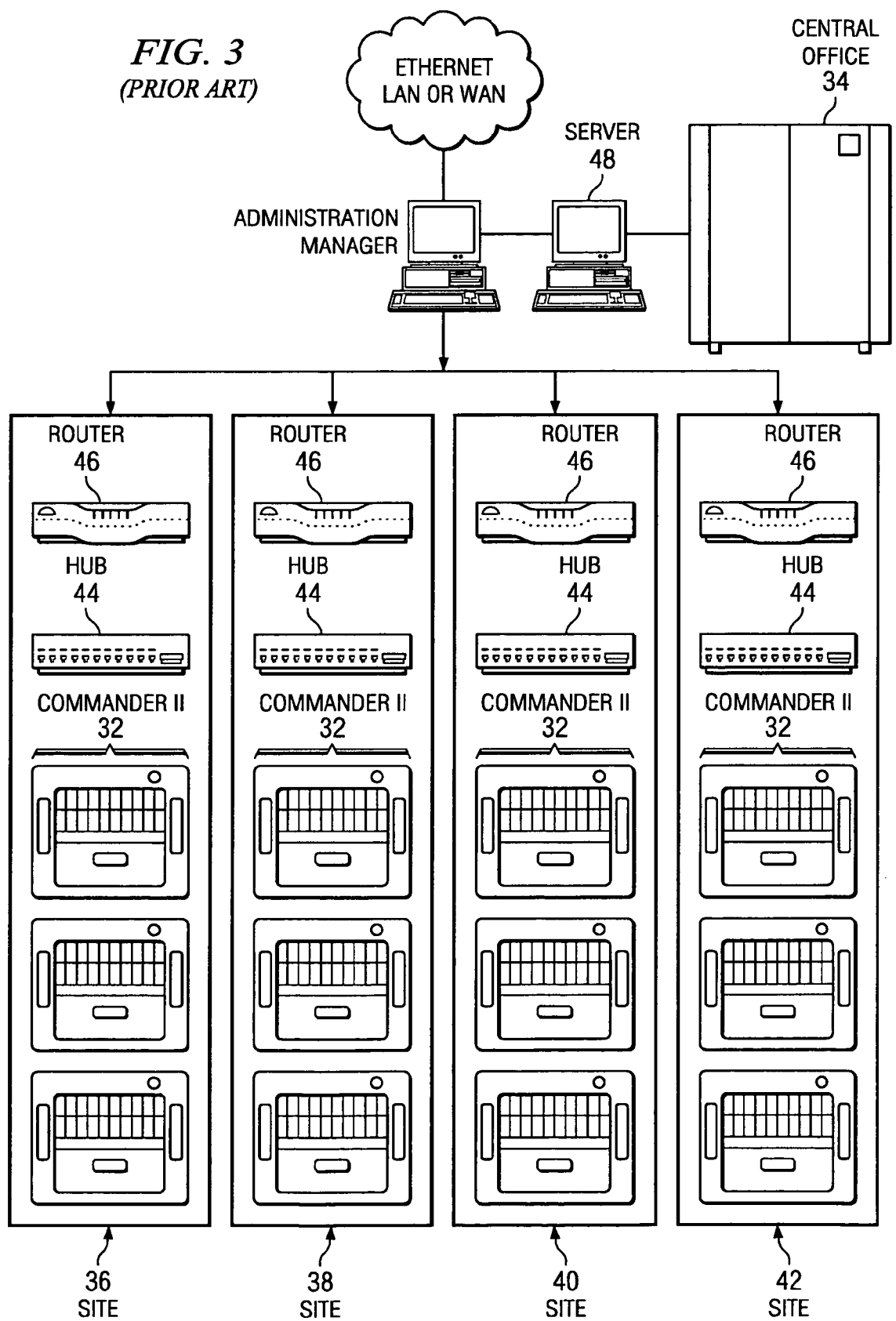
FIG. 3 shows prior art multiple site public telephone systems.

FIG. 2 depicts the prior art in which four public telephones at a single site are connected through a commander™ unit 32 to a central office 34. FIG. 3 depicts four sites 36, 38, 40 and 42 each of which has a plurality of Commander™ units connected through hubs 44 to a router 46. The router 46 routes calls to a server 48 which connects the calls to central office 34.

In accordance with the present invention, lower cost and efficiency are obtained by operating systems such as shown in FIGS. 2 and 3 over Ethernet and Voice over Internet Protocol networks. For example, each prison in a state wide prison system has Commander™ units such as shown in FIG. 3. There may be a thousand phones but all of the phones are connected through Commander™ systems over Voice over Internet Protocol network. Often large administrative systems such as this have existing data networks which process and transmit e-mail and the like. Providing a control computer such as the Commander™ with a VoIP gateway and Ethernet capability allows the public telephone systems at various sites to be integrated into the data network easily.

Figure 4:
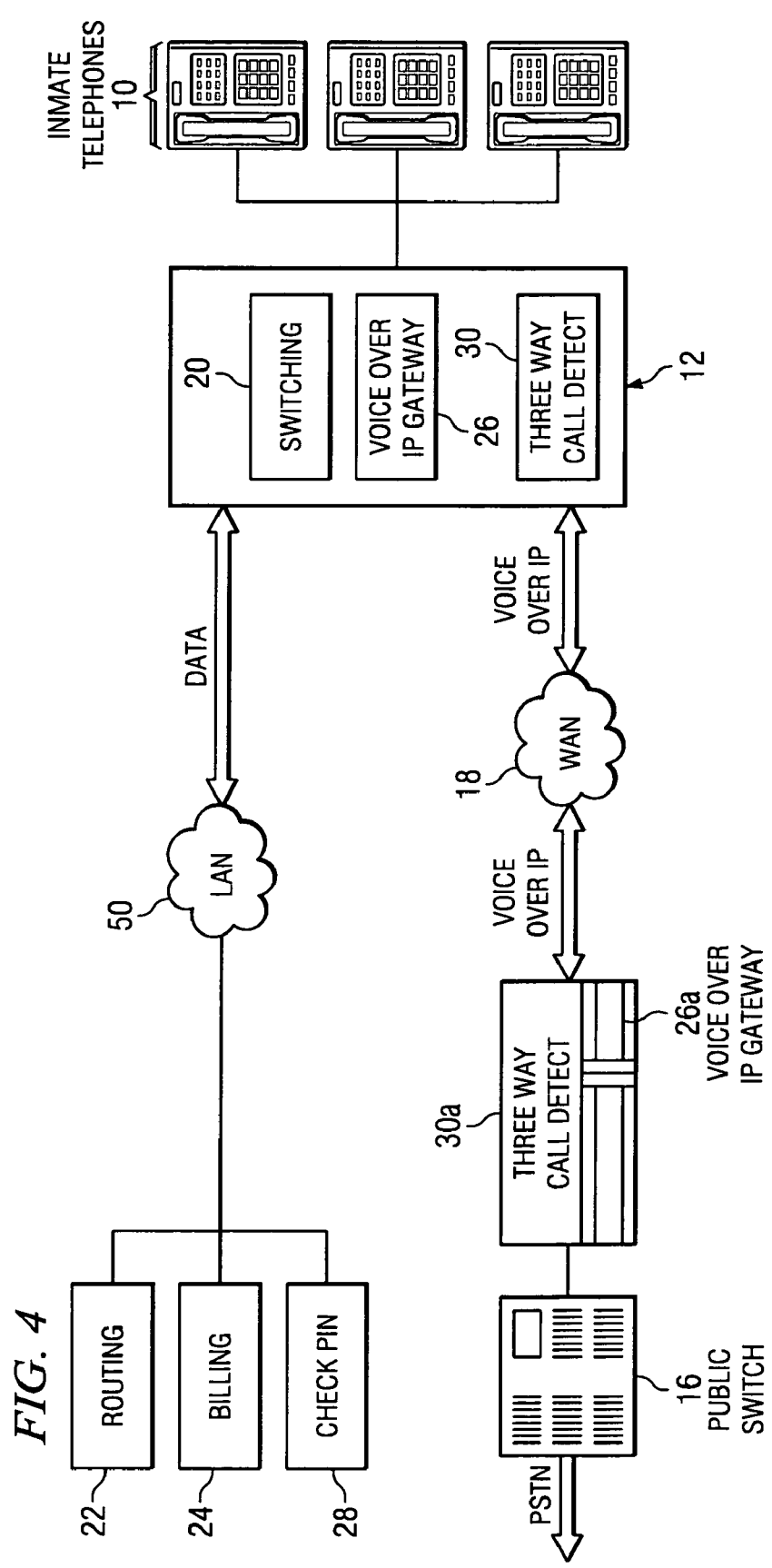
FIG. 4 shows the ability of the invention to access software functions over a data network.

FIG. 4 shows how the programming of control functions may be distributed to remote locations over the Ethernet network. In FIG. 4 the routing function 22, the billing function 24 and the PIN Checking 28 are distributed to a remote location or locations by the Ethernet network 50. As shown in FIG. 4, the network 50 is a local area network (LAN). However, these functions may also be distributed over a WAN. The distribution of these functions to remote locations has the advantage that the functions can be centralized with the functions being performed at a central administration location.

The distribution of a control function is accomplished with programming based on software architecture such as BubbleLINK® and equipment with the ability to enable a seamless connection between traditional circuit-based networks and newer digital packet-based networks. Such equipment includes the Integrator C-2000® series of IP Telephony Gateways and the Commander II Inmate Control phone system (also based on the Integrator C-2000® architecture). The control functions include a wide array of editable call control parameters, advanced call monitoring, real time call recording and three way call fraud detection.

Figure 5:
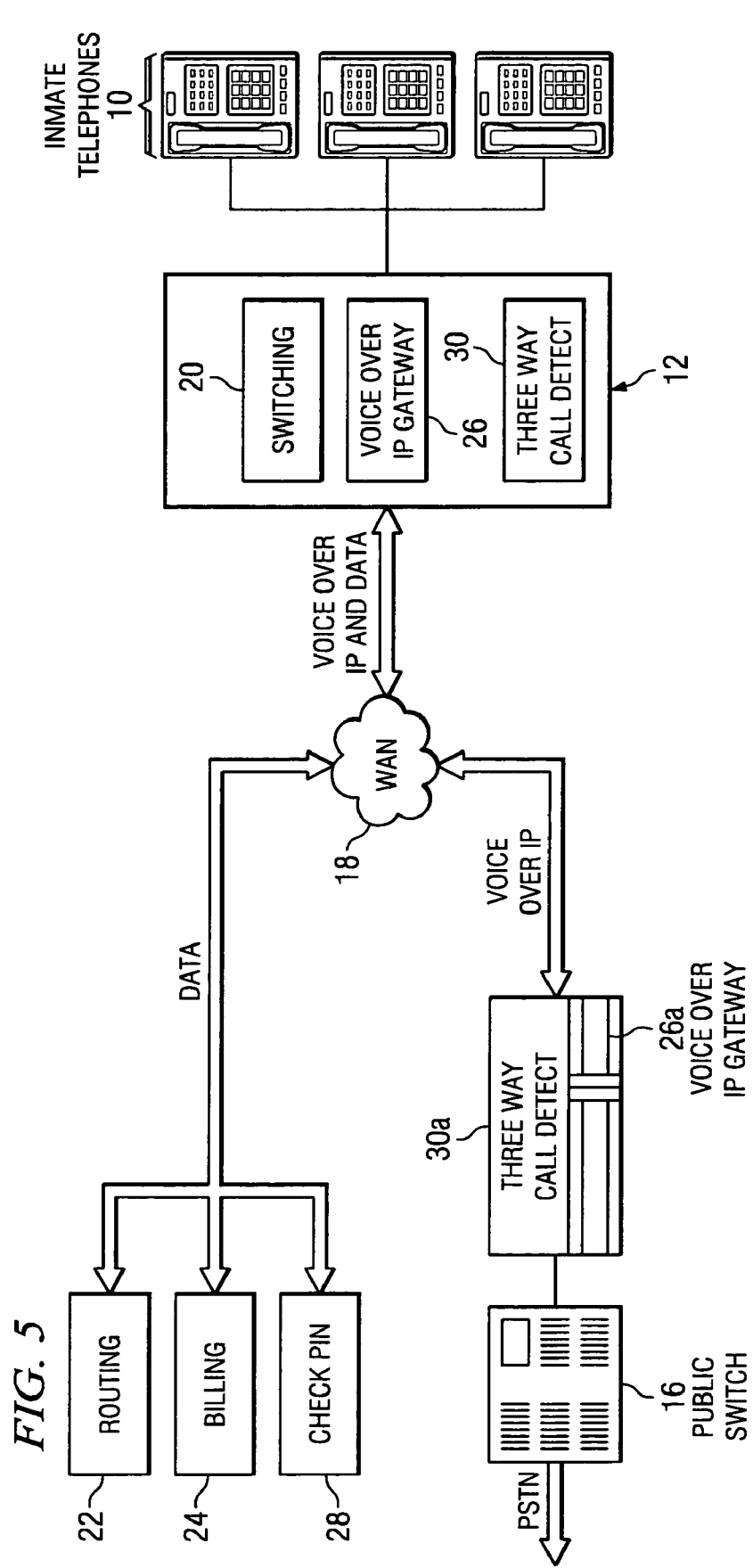
FIG. 5 shows the same ability as FIG. 4 but shows that the VoIP and data network are the same.

FIG. 5 shows the integration of the VoIP and data networks. In this case the telephone communication is integrated into the data exchange network. FIGS. 4 and 5 also show that the three way call detection 30a is moved from the site, i.e. in the control computer 12 as indicted at 30, to a point beyond the VoIP network. VoIP transmission requires voice compression and packetizing. These operations are lossy and detrimental to the ability to perform three way call detection. Therefore, three way call detection is performed at 30a after the telephony signals have been decompressed and depacketized by the VoIP gateway 26a.

Figure 6A:
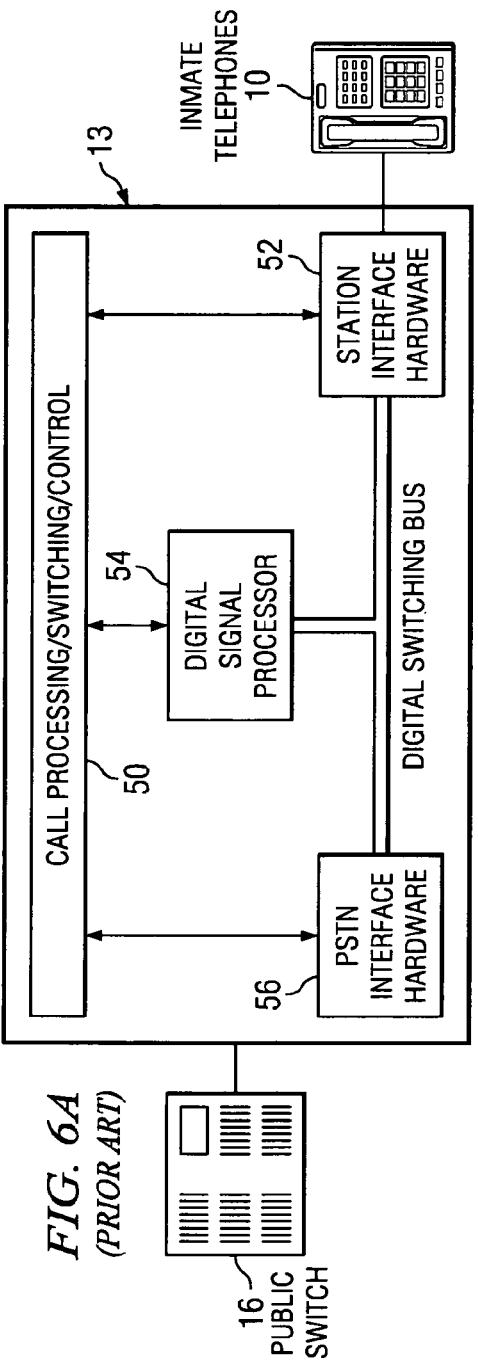
FIG. 6A depicts a prior art control computer.

FIG. 6A depicts a prior art Commander™ control computer 13 which has software 50 for performing the functions of call processing, switching and control. It has station interface hardware 52 which provides an interface with the telephones 10. It has a digital signal processor 54 for processing signals from the telephones 10 as programmed by the software 50. PSTN interface hardware 56 provides an interface to the PSTN switch 16.

Figure 6B:
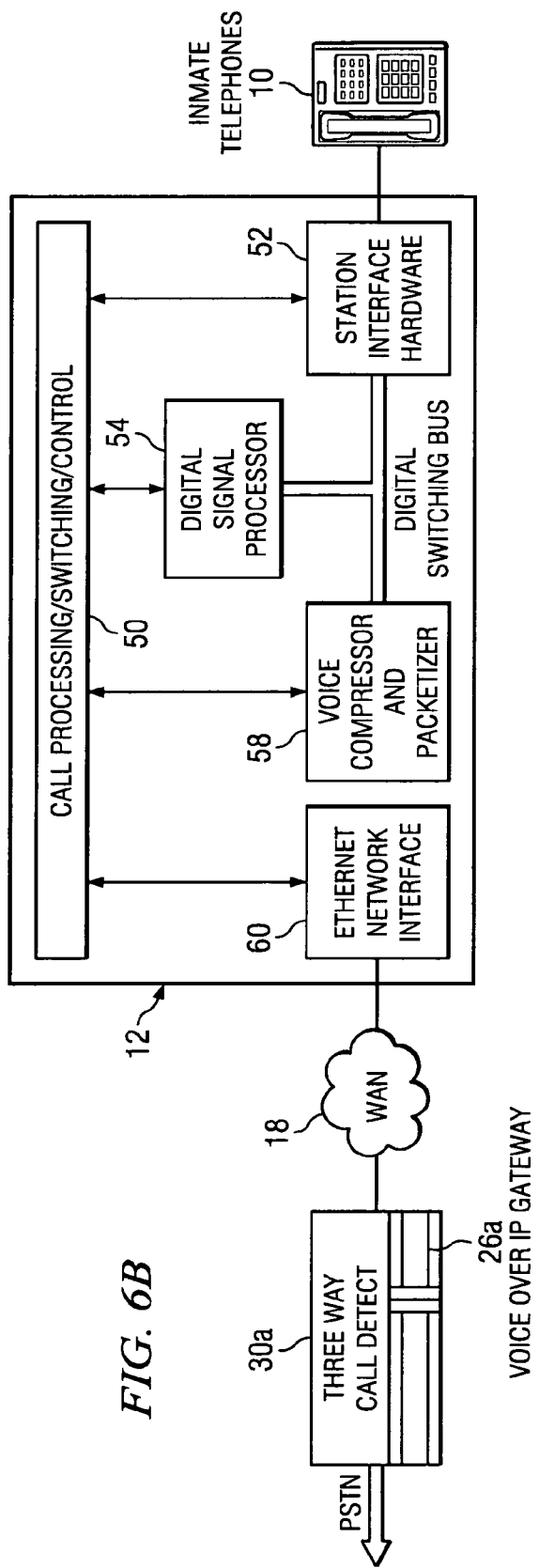
FIG. 6B shows the modifications to the control computer necessary to provide VoIP and data network capability.

FIG. 6B shows modifications to the control computer to provide VoIP and data network capability wherein VoIP gateway 26a and voice compressor and packetizer 58 have been added to produce compressed data packets from the telephony signals. These are the principal functions of the VoIP Gateway 26. The packets are processed in the Ethernet network interface 60 so that they can be applied through the WAN 18, or a LAN, to the VoIP Gateway 26a. The telephone signals are decompressed and depacketized by VoIP gateway 26a and distributed to a public switch. Preferably, three way call detection is performed at this point by three way call detect system 30a.

Mixed modes providing both Local access wire circuits (analog or digital) and VoIP may be used. The local access circuits transport local calls at fixed lower rates to a Local Exchange Carrier (LEC), while the VoIP portion transports higher cost long distance calls to an Inter-Exchange Carrier (IXC). By connecting a plurality of sites on the WAN, multiple sites could share a common set of local access circuits. The sharing of local access circuits is called 'Edge Routing'. The Edge Routing negates the need for local access circuits at each facility.

While a particular embodiment of the invention has been shown and described various modifications may be made.

The appended claims are, therefore, intended to cover all such modifications within the true spirit and scope of the invention.

The invention claimed is:

1. A control computer for connecting a plurality of telephones at a restricted site to an offsite public switching network via a Voice over Internet Protocol (VoIP) network, said control computer comprising:
   a storage for storing restrictions associated with usage of said plurality of telephones by individuals; and
   a first VoIP gateway for translating call signals from said telephones for a call authorized by the stored restrictions into data packets, the first VoIP gateway transmitting the data packets over said VoIP network to a second VoIP gateway for processing the received data packets into telephone signals transmitted to said offsite public switched telephone network via a three-way call detection system for imposing a three-way call restriction, said three-way call detection system being disposed between a second VoIP gateway and said offsite public switched telephone network.

2. The system of claim 1 wherein said first VoIP gateway further performs voice compression and packetization of the call.

3. The system of claim 1 wherein the second VoIP gateway performs decompression and depacketization of the data packets received from the first VoIP gateway.

4. The system of claim 1 wherein said first VoIP gateway includes an Ethernet network interface.

5. The control computer of claim 1 wherein said storage further stores account information including personal identification numbers (PINs) of the individuals, a PIN received at the control computer via at least one of said plurality of telephones for obtaining authorization to place a call by at least one of the individuals associated with the PIN.

6. A method for providing prison facility call processing, said method comprising:
   coupling a prison telephone system to an IP network via a call processing system including a first Voice over Internet Protocol (VoIP) gateway; and
   interfacing a telephone terminal of said prison telephone system with a public switched telephone network (PSTN) via the first VoIP gateway, a second VoIP gateway and a three-way call detection system responsive to the call processing system authorizing a call placed on the telephone terminal, the second VoIP gateway placed between the PSTN and the IP network, and the three-way call detection system placed between said second VoIP gateway and said PSTN.

7. The method of claim 6 further comprising:
   the three-way call detection system monitoring said authorized call to detect three-way calling.

8. The method of claim 7 wherein the three-way call detection system is located remotely with respect to said prison telephone system.

9. The method of claim 6 further comprising: said call processing system recording the authorized call.

10. The method of claim 6 further comprising: said call processing system providing billing with respect to said authorized call.

11. The method of claim 6 further comprising: said call processing system routing said authorized call.

12. The method of claim 6 further comprising: said call processing system checking caller identification with respect to said authorized call.

13. The method of claim 6 further comprising: said call processing system providing three-way call detection with respect to said authorized call.

14. The method of claim 6 further comprising: said call processing system providing fraud detection with respect to said authorized call.

15. The method of claim 6 further comprising: said call processing system providing call monitoring with respect to said authorized call.

16. The method of claim 6 further comprising:
   authorizing the call responsive to receiving a personal identification number (PIN) associated with an account stored in the centralized system.

17. A controlled telephone communications system comprising:
   a control computer comprising a first Voice over Internet Protocol (VoIP) gateway for processing calls from a restricted site into VoIP communication data packets transmitted over an IP network, and a switch selectively connecting the calls with an offsite public switched telephone network (PSTN) via said IP network;
   a second VoIP gateway disposed between said IP network and said offsite PSTN for processing the VoIP communication data packets into telephone signals for transmission over said offsite PSTN; and
   a three-way call detection system disposed between said second VoIP gateway and said offsite PSTN, said three-way call detection system configured to perform three-way call detection upon the telephone signals.

\* \* \* \* \*